United States Patent [19]
Orth et al.

[11] 3,878,462
[45] Apr. 15, 1975

[54] TAUT BAND SUSPENSION SYSTEM WITH STRAIN RELIEF

[75] Inventors: Edward D. Orth, Boxford; Carl F. Van Bennekom, Lynnfield, both of Mass.; Ronald H. MacPherson, Bloomington, Ill.

[73] Assignee: General Electric Company, Lynn, Mass.

[22] Filed: Dec. 6, 1973

[21] Appl. No.: 422,257

[52] U.S. Cl. ............ 324/154; 174/135; 339/103 R
[51] Int. Cl. .......................... G01r 5/02; G01r 1/00
[58] Field of Search ......... 324/154; 339/102, 103 R; 174/42, 135

[56] References Cited
UNITED STATES PATENTS

| | | | |
|---|---|---|---|
| 2,768,231 | 10/1956 | Schwennesen et al. | 339/103 B |
| 3,405,360 | 10/1968 | Hayter | 324/154 R |
| 3,406,340 | 10/1968 | Seibel | 324/154 R |
| 3,590,375 | 6/1971 | Sills | 324/154 R |
| 3,597,686 | 8/1971 | Kain | 324/154 R |
| 3,624,505 | 10/1971 | Boreas | 324/154 R |
| 3,681,692 | 8/1972 | Haas et al. | 324/154 R |
| 3,705,445 | 12/1972 | Smollinger | 174/42 UX |
| 3,744,008 | 7/1973 | Castellani | 339/103 B |

FOREIGN PATENTS OR APPLICATIONS

| | | | |
|---|---|---|---|
| 954,172 | 12/1949 | France | 324/154 R |
| 933,042 | 9/1955 | Germany | 324/154 R |

*Primary Examiner*—Gerard R. Strecker

[57] ABSTRACT

A band strain relief for a measuring instrument having a moving element supported by a taut band suspension. Elastic material applied to the band adjacent to the band anchor provides a strain gradient preventing local stress peaks tending to cause rupture of the band in a vibrating environment.

11 Claims, 6 Drawing Figures

– 1 –

TAUT BAND SUSPENSION SYSTEM WITH STRAIN RELIEF

BACKGROUND OF THE INVENTION

This invention relates to measuring instruments having a rotating element such as an armature and, more particularly, to a taut band suspension system for supporting the armature of such instruments for rotation with low friction.

Taut band suspension systems for low-friction measuring instruments have come into widespread use for many applications as a substitute for the older pivot and jewel bearing system. In a taut band suspension system, the moving element of the instrument is suspended on two extremely fine metal bands which are held in tension by resilient anchors supported on the instrument frame. The taut bands not only provide a low-friction rotary support for the armature but, by their twisting action, provide a countertorque for returning the instrument to zero when de-energized. Because of their low friction and shock resistance, low cost taut band suspensions are preferred over the older pivot and jewel system for many applications. However, in severe vibrating environments the taut band suspension is subject to failure due to rupture of the bands caused by localized peak stresses which usually occur in the area of the band where it is attached to the band anchor. In order to broaden the application of the less expensive taut band suspensions, it is desirable to reduce or eliminate the occurrence of such vibration-induced failures.

Accordingly, it is an object of this invention to provide a taut band suspension system for instruments that is less subject to failure caused by vibration-induced stresses in the band.

A further object of the invention is to provide an improved strain relief for a taut band suspension system which prevents band failure caused by high localized stresses in the band in a vibrating environment.

A still further object of the invention is to provide a strain relief for a taut band suspension system which can be applied at low cost and which is well adapted for use in automated mass production.

Further objects and advantages of the invention will become apparent as the following description proceeds.

SUMMARY OF THE INVENTION

In accordance with the invention, a strain relief is applied to the taut bands in the area of the band adjacent to the band anchor. This is accomplished by placing a small quantity of elastic material on the band so that it surrounds and is bonded to the band. This elastic material provides a strain gradient along the band at the point where it joins the band anchor thereby preventing local stress peaks tending to cause fatigue in a vibrating environment. The strain relief is preferably placed adjacent to the inner band anchors but may also be placed adjacent to the outer band anchors where required. In a preferred embodiment a silicone rubber is used which is applied to the band in an uncured thixotrophic state after which it is air cured to a resilient rubber bonded to the band.

For a better understanding of the invention, reference should be made to the following detailed description taken in connection with the accompanying drawings.

DETAILED DESCRIPTION

Figure 1:
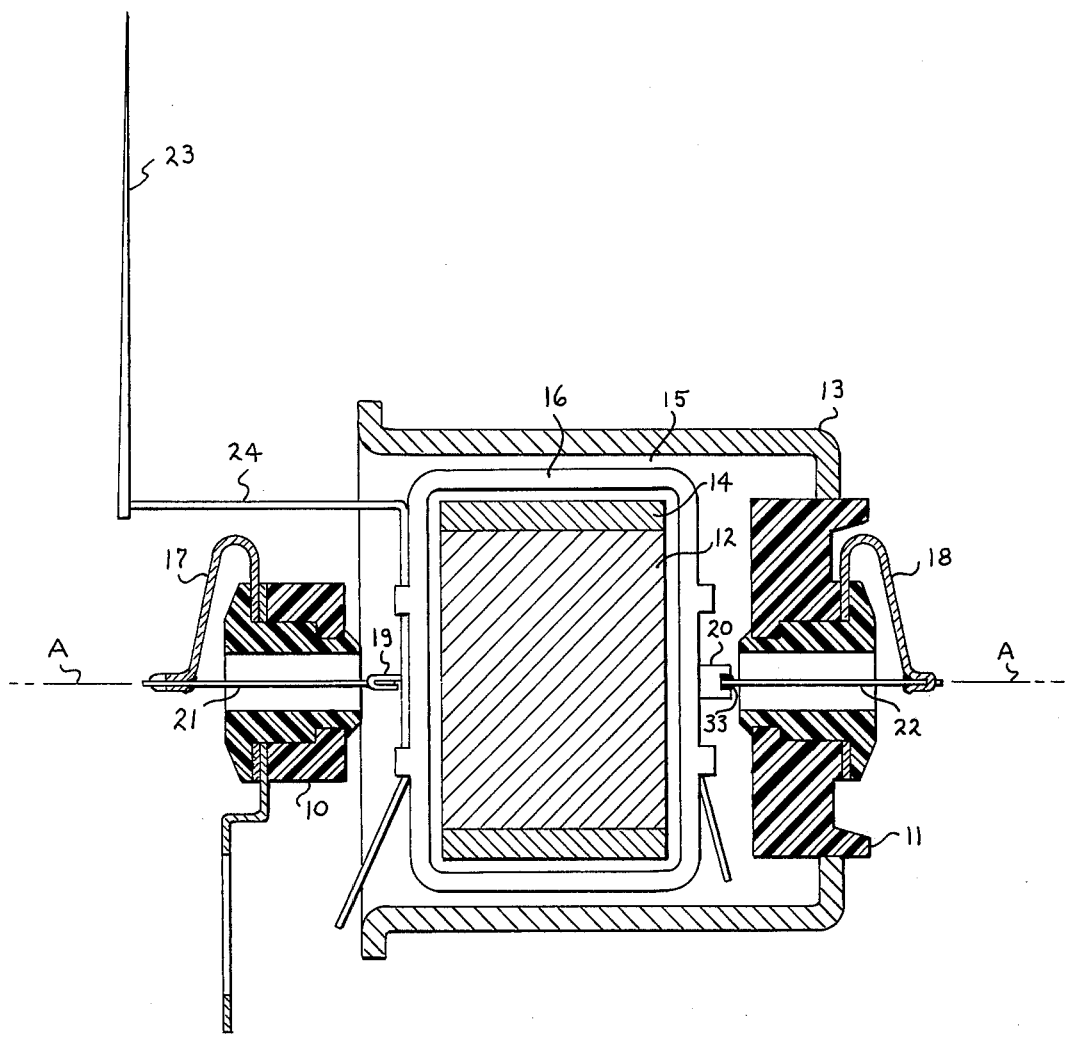
FIG. 1 is a sectional view of an instrument assembly having a taut band suspension to which the band strain relief of the present invention is applied.

Referring now to FIG. 1, there is shown for purposes of illustration a panel meter to which the present invention is applied. The basic instrument may, for example, be similar to the one disclosed in U.S. Pat. No. 3,597,686, assigned to the same assignee as the present invention to which reference may be made for constructional details. As shown the instrument assembly comprises stationary frame members 10 and 11 on which are mounted in spaced relation a permanent magnet assembly 12 and a circular flux cup 13. The magnet assembly comprises a cylindrical permanent magnet and arcuate pole pieces 14 which with the adjacent portions of the flux cup 13 define a uniform air gap 15 therebetween.

Mounted for rotation in air gap 15 is a rotor or armature assembly comprising a rectangular armature frame 16 on which is wound an armature coil (not shown). The armature frame 16 is suspended by a taut band suspension system to which the subject invention is applied.

As shown the taut band suspension system comprises a pair of U-shaped resilient outer band anchors 17 and 18 carried respectively on stationary frame members 10 and 11 and a pair of inner band anchors 19 and 20 carried on armature frame 16. A taut band 21 has inner and outer ends fastened to band anchors 17 and 19 while taut band 22 has inner and outer ends fastened to band anchors 20 and 18. The taut bands are formed of a strip of metal with a rectangular cross section and for an instrument of the type illustrated the width of the strip may be of the order of 0.006 inch while the thickness may be of the order of 0.0006 inch. These fine metal bands are maintained in tension by the resilient outer band anchors 17 and 18 and support the armature frame 16 for rotation about an axis A-A extending in the direction of the bands. Electrical current supplied to the armature coil through the taut bands by connections (not shown) causes the armature to rotate in the flux produced by the permanent magnet as is well understood by those skilled in the art. A pointer 23 mounted on the armature frame 16 by a support 24 provides an indication of a measured quantity that varies as a function of armature current. The torque produced by the armature current rotates the pointer upscale while the countertorque produced by twisting of the taut bands returns the pointer to zero when the armature is de-energized.

Figure 2:
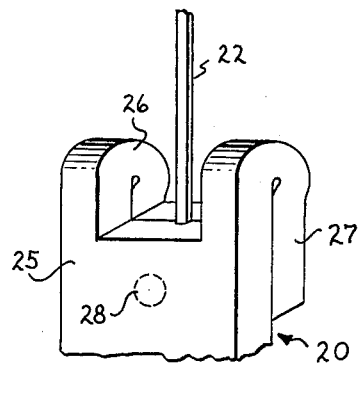
FIG. 2 is an enlarged perspective view showing details of the inner band anchor forming a part of the instrument of FIG. 1.

The construction of one of the inner band anchors 20 is shown in FIG. 2. The outer portion of the anchor is formed by a tab 25 having a notch 26. The notch is formed by first punching a rectangular aperture adjacent to the end of the tab 25 while it is straight and then bending over an end portion 27 so as to clamp the taut band 22 in the position shown in which it emerges from the clamp in the center of the notch 26. The bent over end portion 27 and the taut band 22 are secured in position by use of an electric resistance welder, the weld position being indicated by the dotted line 28. It will be understood that the construction of the other inner band anchor 19 is similar except that it is rotated 90° with respect to anchor 20 as shown in FIG. 1. This is done to obtain better operating characteristics of the taut band suspension.

Figure 5:
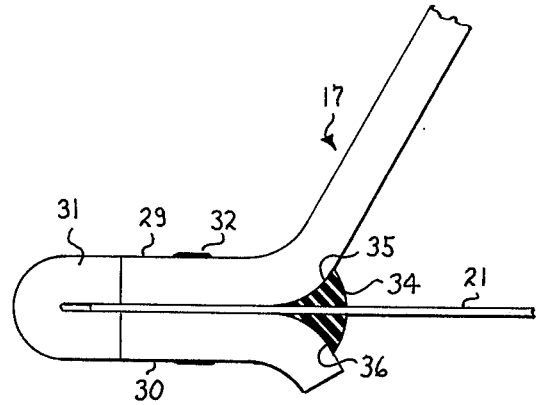
FIG. 5 is an enlarged view of a portion of the outer band anchor forming a part of the instrument of FIG. 1 with elastic strain relief material applied to the band adjacent thereto.

The construction of the end portion of the outer band anchor 17 is shown in FIG. 5. It has a bent up tab 29 with a bent over end portion 30 which clamps the end of the taut band 21. A notch 31 formed by punching out a section of the tab 29 prior to bending over end 30 permits the end of the taut band 21 to extend out beyond the clamped section to facilitate cutting the band 21 to proper length during assembly. The bent over end 30 and the end of the taut band 21 are secured in position by electric resistance welding, the weld area being indicated by numeral 32. It will be understood that the construction of the end portion of the other band anchor 18 is the same as anchor 17 described above.

The construction of the instrument shown in FIG. 1 as described above is known, being shown, for example, in the aforesaid U.S. Pat. No. 3,597,686. While instruments of this type have been found satisfactory for many applications, failure of the taut bands by rupture has occurred when the instrument has been subjected to severe vibration. Such vibration may occur, for example, during shipment. The rupture of the bands usually occurs adjacent to the inner band anchor 19, 20 at the point where the band emerges from the tab 25. It is believed that when flexing of the band relative to the armature frame 16 occurs in a plane including the wide dimension of the band, a localized peak tear stress occurs in the edge of the band adjacent to the band anchor. Such stress is believed to cause fatigue and ultimate rupture of the band. According to the invention such band rupture is prevented by application to the band of strain relief means which will now be described.

To prevent rupture of the bands adjacent to the band anchor, a quantity of elastic material is placed on the band so that it surrounds the band in an area adjacent to the point of attachment of the band to the band anchor. The elastic material acts as a strain relief by providing a strain gradient along the band which keeps peak band stresses below the elastic limit of the band material. By selecting an elastic material with the proper elasticity and hardness characteristics and by properly placing and distributing the elastic material along the length of the band, strain relief can be obtained without substantially altering the desired dynamic characteristics of the instrument. Tests have shown that placement of the elastic material adjacent to the inner band anchors is sufficient to prevent rupture of the bands due to vibration. However, in extreme cases placement of the elastic material adjacent to the outer band anchors may also be desirable. Both applications are illustrated and discussed below.

Figure 3:
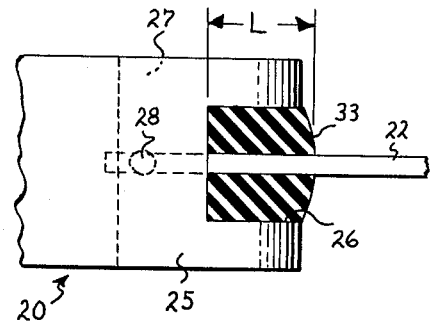
FIG. 3 and FIG. 4 are side and end views of the band anchor of FIG. 2 after the elastic strain relief material has been applied.
Figure 4:
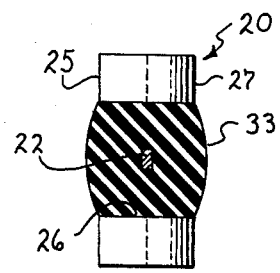

Application of the strain relief to the inner band anchor 20 is shown in FIG. 3 and FIG. 4. It will be noted that a quantity of elastic strain relief material 33 is applied to the taut band 22 adjacent to the point of attachment of the band to the band anchor tab 25. Conveniently, the material 33 may be placed in and retained in position by the notch 26. The elastic material 33 should be firmly bonded to the taut band 22 and preferably also bonded to the band anchor 20 for support. Bonding of the elastic material 33 to the sides and bottom of notch 26 accomplishes this.

The length of the band, L, along which elastic material 33 is bonded should be properly selected for optimum results. Tests have shown that the length L should be in the range of two to four times the width of the band. Thus, if the band width is 0.006 inch, the dimension L should lie in the range of 0.012 inch to 0.024 inch. If the dimension L is too short, the peak band edge stress may exceed the elastic limit. On the other hand, if the dimension L is too long, the hysteresis effect in the elastic material 33 may be sufficient to adversely affect the dynamic characteristics of the instrument. Test results show that when properly positioned and proportioned the instrument error caused by the strain relief is only about 10 percent of the total permissible error limit for the instrument. Specifically, in the case of the instrument described above which commonly has a permissible error limit of 2 percent it was found that error caused by the strain relief material properly designed and applied did not exceed 0.2 percent.

Selection of an elastic strain relief material with optimum physical properties and bonding characteristics is also important. Good results have been obtained using a room temperature vulcanizing silicone rubber identified as RTV-102 silicone rubber. This material is manufactured by and obtainable from General Electric Company, Silicone Products Department, Waterford, N.Y. 12188. It is applied to the band in a thixotropic state after which it air cures to a resilient rubber at room temperature. This material provides an excellent bond to both the band and the band anchor without any priming of the bonded surfaces. It absorbs shock and vibration and retains its elastomeric properties at extreme temperature. Other physical properties of this material when cured which are believed to be desirable for this application are as follows:

| | |
|---|---|
| Hardness, Shore A Durometer | 30 |
| Elongation % | 400 |
| Tear Resistance, die B, lb/in | 45 |

Another material which has been found usable for this strain relief application is a two part soft epoxy known as Stycast 2741 Epoxy Potting Compound. It is obtainable from Emerson and Cuming, 869 Washington Street, Canton, Mass.

It will be understood that the strain relief material 33 is also applied to the other inner band anchor 19 in the same manner as illustrated in FIGS. 3 and 4. Also, for some applications, it may be desirable to apply the strain relief material 33 to the outer band anchors 17, 18 as well. This is illustrated in FIG. 5 where a quantity of elastic material 34 is applied to the inner side of the outer band anchor 17. For support, the material 34 is bonded to side portions 35 and 36 of the band anchor 17 as well as to taut band 21. The strain relief material is also applied to the other outer band anchor 18 in the same manner as illustrated in FIG. 5.

Figure 6:
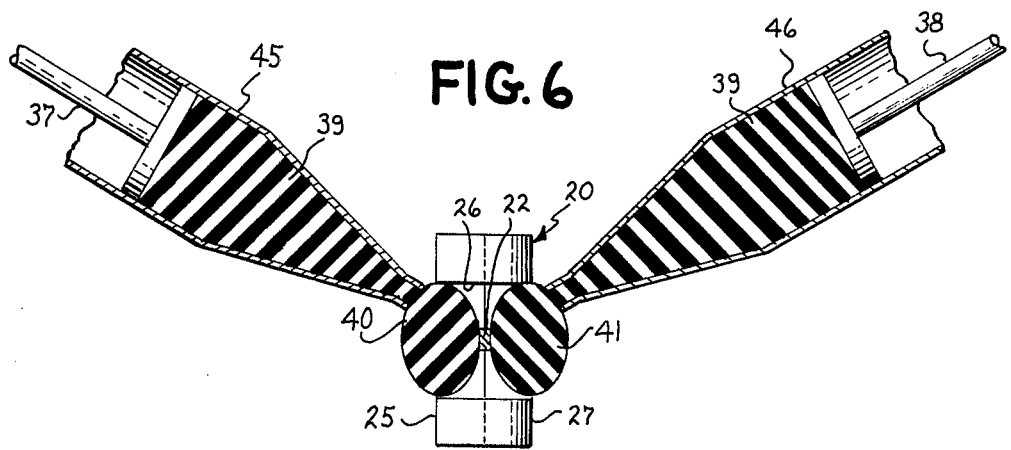
FIG. 6 illustrates how injection guns may be used to apply the elastic strain relief material to band anchor in mass production.

The use of silicone rubber as a strain relief material for instrument taut bands is well suited for production using automated mass production techniques. Such an application is illustrated in FIG. 6. Here two injection guns 45 and 46 having automatically operated plungers 37 and 38 and loaded with uncured silicone rubber 39 are arranged to deposit globules 40 and 41 of the rubber on opposite sides of taut band 22 within notch 26. The globules 40, 41 then coalesce around the band and form a bond with both the band 22 and the sides of notch 26 as illustrated in FIG. 3 and FIG. 4. The injection guns 45, 46 are programmed to inject a measured quantity of rubber on the band so that the length, L, of the strain relief after the rubber is cured is within the proper limits.

The taut band strain relief of the present invention has obvious application to other types of instruments. It may, for example, be equally well applied to switchboard type of taut band instruments such as are shown in U.S. Pat. No. 3,277,370 - Clark. It may also be applied to accelerometers and in fact to any type of instrument or device having a moving element supported by taut bands extending between band anchors on relatively movable parts.

While there has been shown what is presently considered to be a preferred embodiment of the invention, it will be apparent to those skilled in the art that various changes and modifications may be made therein without departing from the spirit and scope of the invention.

What is claimed as new and desired to be secured by Letters Patent in the United States is:

1. A taut band suspension system for supported a rotor of a measuring instrument for rotation relative to a fixed support comprising:
   an outer band anchor mounted on said support,
   an inner band anchor mounted on said rotor,
   a taut band having one end attached to said outer band anchor and the other end attached to said inner band anchor so as to support said rotor for rotation about an axis extending in the direction of the band, and
   strain relief means for preventing fatigue producing stress of the band in a vibrational environment, said strain relief means comprising a quantity of soft elastic material surrounding and bonded to the taut band in an area of the band adjacent to the point of attachment of the band to the band anchor.

2. The taut band suspension system of claim 1 wherein the elastic material is also bonded to the adjacent band anchor for support.

3. The taut band suspension system of claim 1 wherein the elastic material extends along the length of the band a distance in the range of 2 to 4 times the width of the band.

4. The taut band suspension system of claim 1 wherein the elastic material is a silicone rubber.

5. The taut band suspension system of claim 1 wherein the elastic material is a silicone material which is applied to the band in a thixotrophic form and subsequently air cures at room temperature to a resilient rubber bonded to the band.

6. The taut band suspension system of claim 1 wherein the elastic material is applied to the taut band adjacent to the inner band anchor.

7. The taut band suspension system of claim 1 wherein the elastic material is applied to the band adjacent to both the inner and outer band anchors.

8. The taut band suspension system of claim 1 wherein the band anchor comprises a support member extending along and spaced from the band inside of the point of attachment of the band to the anchor and the elastic material is bonded to both the taut band and the support member.

9. The taut band suspension system of claim 8 wherein the support member is a notched tab extending along both sides of the taut band.

10. The taut band suspension system of claim 1 including two sets of inner and outer band anchors with a taut band extending between each set of band anchors and the elastic material is applied to the taut band of each set adjacent to its associated inner band anchor.

11. The taut band suspension system of claim 10 wherein the elastic material is also applied to each taut band adjacent to its associated outer band anchor.

* * * * *